United States Patent Office 3,270,096
Patented August 30, 1966

3,270,096
PROCESS FOR PRODUCTION OF PHOSPHORUS DIESTERS
William M. Lanham, Charleston, and Percy L. Smith, Dunbar, W. Va., assignors to Union Carbide Corporation, a corporation of New York
No Drawing. Filed Feb. 8, 1963, Ser. No. 257,106
7 Claims. (Cl. 260—976)

This invention relates to the preparation of organic phosphorus esters. More particularly the invention is directed to a novel process for the production of di(haloalkyl) phosphites.

Processes heretofore employed for the production of organic phosphorus diesters have been undesirable from a commercial standpoint due to process difficulties which they present. The prior methods for the manufacture of organic phosphorus diesters involved reaction of a phosphorus trihalide with an alcohol. This process results in the production of gaseous hydrogen halide, a by-product which demands special handling. Thus, the preparative procedures heretofore employed have presented bothersome corrosion and disposal problems as a result of the toxicity and reactivity of the hydrogen halide by-product. Further disadvantages accrue since at temperatures much above 0° C. the desired phosphorus diesters will react with hydrogen halide. Consequently further provisions must be made for the immediate removal of the hydrogen halide from the reaction area.

It is, therefore, an object of the present invention to provide a novel and direct process for the production of di(halo-alkyl) phosphites which does not result in the formation of acidic by-products. It is a further object of the invention to provide such a novel and direct process which also yields quantitative amounts of dialkyl phosphites. It is a further object of the invention to provide such a process which is readily adaptable to large scale production.

In accordance with the instant novel process a tri(haloalkyl) phosphite is reacted with a phosphorus trihalide, preferably phosphorus trichloride, and a monohydroxy compound. The novel process may be illustrated by the following equation:

(A)

$$2(XRO\!-\!)_3 P + PX'_3 + 3R'OH \longrightarrow$$
(I)              (II)

$$2(XRO\!-\!)_2 PH\overset{O}{\|} + (R'O\!-\!)_2 PH\overset{O}{\|} + 2X'RX + R'X'$$
(III)              (IV)

wherein R is a divalent alkylene radical of from 2 to 18 carbon atoms having the formula $$\left(\begin{array}{c} R_1\ R_2 \\ -C-C- \\ R_3\ R_4 \end{array}\right)$$

wherein $R_1$ through $R_4$ are hydrogen or alkyl, or haloalkyl radicals, wherein X and X' individually, are halogens, e.g., chlorine or bromine, and wherein R' is a straight chain or branched chain alkyl or haloalkyl radical having from 1 to 18 carbon atoms.

It may be readily seen from a consideration of the reaction set forth above that the reaction product mixture contains two parts of di(haloalkyl) phosphite (III) having a haloalkyl moiety corresponding to that of the tri(haloalkyl) phosphite reactant (I), and also contains one part of a phosphorus diester (IV) having an organic moiety corresponding to that of the particular alcohol (II) which is employed. It is therefore apparent that if the alcohol reactant is selected so as to possess the same haloalkyl moiety as that of the tri(haloalkyl) phosphite reactant (that is, if the R' substituent of the alcohol in the above equation is identical to XR— substituent of the tri(haloalkyl) phosphite, the reaction product will contain a single di(haloalkyl) phosphite. Thus in a preferred embodiment of the novel process a tri(haloalkyl) phosphite is reacted with phosphorus trihalide and an alkylene halohydrin, said halohydrin having the same haloalkyl moiety as the said tri(haloalkyl) phosphite. This embodiment may be illustrated by the following equation:

(B)

$$2(XRO\!-\!)_3 P + PX'_3 + 3XROH \longrightarrow 3(XRO\!-\!)_2 PH\overset{O}{\|} + 3X'RX$$

wherein R is again a divalent alkylene having 2 to 18 carbon atoms having the formula $$\left(\begin{array}{c} R_1\ R_2 \\ -C-C- \\ R_3\ R_4 \end{array}\right)$$

wherein $R_1$ through $R_4$ are hydrogen, alkyl or haloalkyl radicals and wherein X and X', individually, are halogen, e.g., chlorine or bromine.

The tri(haloalkyl) phosphites which are utilized as reactants in Equations A and B above are known in the art. These compounds may be conveniently prepared by reacting a phosphorus trihalide and an alkylene oxide, e.g., ethylene oxide can be reacted with phosphorus trichloride to yield tri(2-chloroethyl) phosphite.

Illustrative of the tri(haloalkyl) phosphite reactants hereinbefore broadly described, are those which are characterized by at least one halogen atom e.g., chlorine or bromine substituted on each beta carbon atom and which are free from substitution other than halogen substitution. Thus further halogen substitution on the alkylene moiety is not precluded. The tri(chloroalkyl) phosphites are eminently preferred. The tri(haloalkyl) phosphites which may be employed in the novel process include tri(2-chloroethyl) phosphite,
tri(2-chloromethylethyl) phosphite,
tri(2-chloromethyl-2-chloroethyl) phosphite,
tri(1-methyl-2-chloroethyl) phosphite,
tri(2-chlorobutyl) phosphite,
tri(2,4-dichloro-butyl) phosphite,
tri(1-methyl-2-chlorobutyl) phosphite,
tri(1-chloroethyl-2-chlorobutyl) phosphite,
tri-(2-chloropentyl) phosphite,
tri(2,5-dichloropentyl) phosphite,
tri(2-chloro-4-methylpentyl) phosphite,
tri(1-ethyl-2-chloropentyl) phosphite,
tri(1-chloromethyl-4-halopentyl) phosphite,
tri(2-chlorohexyl) phosphite,
tri(2-ethyl-2-chlorohexyl) phosphite,
tri(2-chloroethyl-2-chlorohexyl) phosphite,
tri(2,6-dichlorohexyl) phosphite,
tri(2-chloroheptyl) phosphite,
tri(2,5-dichloroheptyl) phosphite,
tri(1-methyl-2-chloroheptyl) phosphite,
tri(2-chlorooctyl) phosphite,
tri(2,4,6-trichlorooctyl phosphite,
tri(2-chlorononyl) phosphite,
tri(1-methyl-2-chlorononyl) phosphite,
tri(2,6,8-trimethyl-2-halononyl) phosphite,
tri(2-halodecyl) phosphite,
tri(2-chloro-6-chloroethyldecyl) phosphite,
tri(2-chloroundecyl) phosphite,
tri(2-chlorododecyl) phosphite,
tri(2,4-dichlorododecyl) phosphite, tri(2-chlorohexadecyl) phosphite,
tri(2,6-dichlorohexadecyl) phosphite,
tri(2-chlorooctadecyl) phosphite, and the like, including the bromine analogs of the above, i.e. tri(2-bromoethyl) phosphite, and the mixed halogen phosphites containing both bromine and chlorine such as tri(2-chloro-4-bromobutyl) phosphite. Suitable compounds are the tri(haloalkyl) phosphites having 2 to 18 carbon atoms in each haloalkyl moiety. Preferred are those tri(haloalkyl) phosphites having 2 to 12 carbon atoms, and highly preferred those having 2 to 6 carbon atoms in each alkylene moiety.

In accordance with a preferred embodiment of the invention, the tri(haloalkyl) phosphite is reacted with phosphorus trihalide and an alkylene halohydrin having the same haloalkyl group as the tri(haloalkyl) phosphite. This procedure results in a product mixture containing a single phosphorus diester having a similar haloalkyl substituent. For example to obtain di(2-chloroethyl) phosphite as the sole phosphorus diester product, tri(2-chloroethyl) phosphite is reacted with phosphorus trihalide and ethylene chlorohydrin.

The broad scope of the alcohol reactant may be stated as including saturated monohydroxy compounds free from substituents which would react with the tri(haloalkyl) phosphite and the phosphorus trihalide reactants. Particularly contemplated are saturated alcohols having from 1 to 18 carbon atoms, preferably from 1 to 12 carbon atoms and still more preferably from 1 to 6 carbon atoms, which alcohols are free from substituents other than halogen substituents. Such alcohols include methanol, ethanol, n-propanol, isopropanol, n-butanol, isobutanol, 2-methyl-1-butanol, 3-methyl-1-butanol, 2-ethylbutanol, pentanol, 2-methyl-1-pentanol, 4-methyl-2-pentanol, n-hexanol, 2-ethylhexanol, 2,2,4-trimethylpentanol, heptanol, octanol, 2,6-dimethyl-4-heptanol, nonanol, decanol, isodecanol, 2,6,8-trimethyl-4-nonanol, undecanol, dodecanol, tetradecanol, hexadecanol, octadecanol, and the halo-substituted derivatives thereof. Of course, in concurrence with the aforesaid preferred embodiment, the alcohol employed in the novel process is an alkylene halohydrin having a haloalkyl moiety identical to that of the tri(haloalkyl) phosphite. These compounds may be defined as commensurate in scope with the tri(haloalkyl) phosphite reactants hereinbefore described in that the haloalkyl moiety of the alkylene halohydrin is identical to that of the tri(haloalkyl) phosphite and are included within the scope of the alcohols as described above. These compounds include ethylene chlorohydrin,
1-chloropropan-2-ol,
1,3-dichloropropan-2-ol,
2-chlorobutanol,
2,4-dichlorotritanol,
3-chloropentanol,
1,4-dichlorohexan-3-ol,
2-chloropentanol,
2,5-dichloropentanol,
2-chlorohexanol,
2-chloro-4-methylpentanol,
2-chloro-4-chloromethylpentanol,
4-chloroheptan-3-ol,
2-ethyl-2-chlorohexanol,
2-chloroethyl-2-chlorohexanol,
2,6-dichlorohexanol,
2-chloroheptanol,
2,5-dichloroheptanol,
3-chloroheptan-2-ol,
2-chlorooctanol,
2,4,6-trichlorooctanol,
2-chlorononanol,
2,6,8-trimethyl-2-halononanol,
2-chlorodecan-3-ol,
2-chlorodecanol,
2-chloro-6-chloroethyldecanol,
2-chloroundecanol,
2-chlorododecanol,
2,4-dichlorododecanol,
2-chlorohexadecanol,
2,6-dichlorohexadecanol,
2-chlorooctadecanol, and the like, including the bromine analogs of the above, i.e. ethylene bromohydrin, and mixed halogen halohydrins containing both chlorine and bromine such as 2-chloro-4-bromobutanol.

The use of an alcohol which does not have the same haloalkyl moiety as that of the tri(haloalkyl) phosphite will result in a product mixture having one mole part of a phosphorus diester which corresponds to that alcohol and two mole parts of di(haloalkyl) phosphite corresponding to the (tri(haloalkyl) phosphite reactant. When the process is conducted in this fashion the phosphorus diester products may be conveniently separated by fractional distillation.

Phosphorus trichloride and phosphorus tribromide are used in the novel process. It is preferred, though not necessary, that the phosphorus trihalide have the same halogen moiety as the tri(haloalkyl) phosphite.

In the practice of this invention, it is desirable to employ stoichiometric proportions of the tri(haloalkyl) phosphite and the phosphorus trihalide with a slight excess of the alcohol or halohydrin reactant. The excess of the hydroxy compound serves to assure the complete reaction of the phosphorus trihalide. An excess of the tri(halohydrocarbyl) phosphite reactant is not desirable because the existence of this compound in the final product mixture serves only to complicate the separation of the di(halohydrocarbyl) phosphite from the product mixture.

In general, it is desirable to effect the novel process at a temperature in the range of from about −20° C. and lower to about 50° C. Since the phosphorus diesters are stable to moderate temperature in the absence of hydrogen chloride, the temperature is not critical. However no appreciable advantage is observed operating at higher temperatures. Moreover, the high reactivity of the phosphorus trihalide can make operation at higher temperatures difficult. For this reason the temperature of the exothermic reaction may be controlled by external cooling or by measured addition of the phosphorus trihalide. For the process a temperature of from about −10° C. to +25° C. is preferred.

Pressure is not critical in the operation of the instant process. The process may be conducted at subatmospheric, atmospheric or superatmospheric pressure.

The reaction should be conducted in a non-aqueous medium since phosphorus trihalide will react with water to form a gaseous hydrogen halide. It is eminently suitable to employ an excess of the alkanol reactant to serve as a medium for the reaction. However, an inert normally liquid organic solvent may also be used. Typical solvents include n-heptane, benzene, toluene, xylene, ethyl ether, isopropyl ether, chlorobenzene, ethylene dichloride and the like.

The process is generally accomplished by the addition of the phosphorus trihalide to a solution of the other reactants. The addition should be accompanied by vigorous agitation to effect a rapid reaction of the phosphorus trihalide. The process may be conducted in a vessel open to the atmosphere. Under such conditions, however, it is preferred to introduce the phosphorus trihalide into the solution of the other reactants at a point below the liquid surface. This procedure is followed to avoid permitting the phosphorus trihalide to come into contact wth atmospheric moisture which would result in a reaction producing gaseous hydrogen halide.

The reaction producing the desired di(haloalkyl) product proceeds fairly rapidly, but the rate will depend on the operative temperature, the specific reactants employed, the concentrations thereof, and the like. A residence time of about one hour is usually sufficient.

The products of this novel are usually employed as residue products after the solvent, excess alkanol and alkyl halide by products have been removed by distillation. It is preferred to conduct this distillation under reduced pressure to minimize the decomposition of the phosphorus diesters which are not very stable at elevated temperatures. In the instance that the mixture contains a dialkyl phosphite as well as a di(haloalkyl) phosphite the two may be conveniently separated by a second distillation.

The di(haloalkyl) phosphite products may be added to an ethylenically unsaturated dicarboxylic acid or its anhydride using a peroxide catalyst to yield as phosphoro-substituted dicarboxylic acid or its anhydride. These phosphoro-substituted acids and anhydrides are flame-proofing hardeners for epoxy resins.

The following examples are illustrative.

*Example 1*

A. To an agitated solution of 135 grams (0.5 mole) of distilled tri(2-chloroethyl) phosphite and 74 grams (0.92 mole) of ethylene chlorohydrin, there was added, dropwise, below the liquid surface, 34 grams (0.25 mole) of phosphorus trichloride at about 0° C. to −5° C. The resulting mixture was permitted to come to 25° C. and was then distilled at 50° C. and 1 mm. of Hg. Distillation of the resulting residue yielded 132 grams of a colorless distillate which was identified as di(2-chloroethyl) phosphite. The distillate exhibited the following properties:

$n_D^{30}$ _____ 1.4687.
Acidity _____ 0.04 cc. of N base/gram.
Percent Cl _____ Actual, 34.43 percent; theory, 34.31 percent.
Yield _____ 85 percent.

B. In an analogous manner as above, when tri(2-bromoethyl) phosphite, ethylene bromohydrin and phosphorus tribromide are employed, there is obtained di(2-bromoethyl) phosphite as the product.

*Example 2*

A. To an agitated solution of 1040 grams (3.86 moles) of crude tri(2-chloroethyl) phosphite and 513 grams (6.37 moles) of ethylene chlorohydrin, there was added, dropwise below the liquid surface, 266 grams (1.93 moles) of phosphorus trichloride at about 0° C. to −5° C. The resulting mixture was allowed to come to 25° C. and was then distilled at 60° C. and 2 mm. of Hg.

Distillation of the resulting residue at 78° C. and less than 1 mm. of Hg yielded 912 grams of distillate which was identified as di(2-chloroethyl) phosphite and exhibited the following properties:

$n_D^{30}$ _____ 1.4687; 1.4694.
Acidity _____ .04 gram of N base/gram.
Yield _____ 76 percent.

*Example 3*

To an agitated solution of 2085 grams (7.74 moles) of crude tri(2-chloroethyl) phosphite and 1028 grams (12.77 moles) of ethylene chlorohydrin, there was added dropwise beneath the liquid surface, 532 grams (3.87 moles) of phosphorus trichloride at 0° C. to −5° C. The mixture was permitted to come to 25° C. and was then stripped by distillation at 100° C. and 1.5 mm. of Hg. The resulting residue of 2438 grams was equivalent to a yield of 101.5%. (The high yield is believed to be due to the presence of di(2-chloroethyl) phosphite in the tri(2-chloroethyl) phosphite reactant.) The residue product was identified as di(2-chloroethyl) phosphite and exhibited the following properties:

$n_D^{30}$ _____ 1.4694.
Acidity _____ 0.14 cc. N base/gram.
Percent purity _____ 95% (by bromination).

*Example 4*

To an agitated solution of 147 grams (0.47 mole) of tris[2-(chloromethyl)ethyl] phosphite and 74 grams (0.78 mole) of 1-chloropropan-2-ol, there was added, dropwise beneath the liquid surface, 32 grams (0.24 moles) of phosphorus trichloride at about 0° C. to −5° C. The mixture was permitted to come to 25° C. and was then stripped by distillation at 65° C. and 1 mm. of Hg. The resulting residue was identified as bis[2-(chloromethyl)ethyl] phosphite and had the following properties:

$n_D^{30}$ _____ 1.4599.
Acidity _____ 0.03 cc. of N base/gram.

*Example 5*

The following illustrates the conventional method for the preparation of tri(2-chloroethyl) phosphite.

To a solution of 491 grams (6.0 moles) of ethylene chlorohydrin was added 275 grams (2.0 moles) of phosphorus trichloride over a period of 1.25 hours at 10°–15° C. and under a pressure of 600 mm. of Hg. The reaction mixture was permitted to stand for about 16 hours under a pressure of 60 mm. of Hg. A residue of 422 grams was distilled at 130°–138° C. and 2.5–1.5 mm. of Hg to yield 283 grams of a product which was equivalent to a yield of 67%. The product was identified as di(2-chloroethyl) phosphite and exhibited the following properties:

$n_D^{30}$ _____ 1.4691.
Acidity _____ 0.08 cc. N base/gram.

What is claimed is:

1. A process which comprises contacting a tri(haloalkyl) phosphite, a saturated monohydroxyl compound free from substitution other than halogen substitution, and a phosphorus trihalide, wherein all the said halogen substituents are selected from the group of chlorine and bromine to produce a di(haloalkyl) phospite).

2. A process which comprises contacting (a) a compound of the formula (X—R—O)₃P, wherein X is of the group consisting of chlorine and bromine, and wherein R is the radical $$\left( -\underset{R_3}{\overset{R_1}{\underset{|}{C}}}-\underset{R_4}{\overset{R_2}{\underset{|}{C}}}- \right)$$

having up to 18 carbon atoms, wherein $R_1$ through $R_4$ are of the group consisting of hydrogen, alkyl, and haloalkyl; (b) a saturated monohydroxyl compound free from substitution other than halogen substitution, and (c) phosphorus trihalide, to produce a di(haloalkyl) phosphite of the formula $$(XRO)_2\overset{O}{\underset{\|}{P}}H$$

wherein R and X have the same designations as above.

3. A process which comprises contacting (a) a compound of the formula (X—R—O)₃P, wherein X is of the group consisting of chlorine and bromine, and wherein R is the radical $$\left( -\underset{R_3}{\overset{R_1}{\underset{|}{C}}}-\underset{R_4}{\overset{R_2}{\underset{|}{C}}}- \right)$$

having up to 18 carbon atoms, wherein $R_1$ through $R_4$ are of the group consisting of hydrogen, alkyl, and haloalkyl; (b) an alkylene halohydrin having a haloalkyl moiety identical to that of the said tri(haloalkyl) phosphite; and (c) a phosphorus trihalide, at a temperature of from about −20° C. to about 50° C., to produce a di(haloalkyl) phosphite of formula $$(X—R—O)_2\overset{O}{\underset{\|}{P}}H$$

wherein R and X have the same designation as above.

4. A process which comprises contacting a tri(chloroalkyl) phosphite having from 2 to 12 carbon atoms in each alkyl moiety, a monohydroxyl compound free from substitution other than chlorine substitution and phosphorus trichloride at a temperature of from about —20° C. to about +50° C. to produce a di(haloalkyl) phosphite.

5. A process which comprises a tri(chloroalkyl) phosphite having from 2 to 12 carbon atoms, an alkylene chlorohydrin having a chloroalkyl moiety identical to that of the said tri(chloroalkyl) phosphite and phosphorus trichloride at a temperature of about —20° C. to about +20° C. for a period of time sufficient to produce a di(chloroalkyl) phosphite.

6. A process which comprises contacting tri(2-chloroethyl) phosphite, ethylene chlorohydrin and phosphorus trihalide at a temperature of from about 20° C. to about 50° C. to produce di(2-chloroethyl) phosphite.

7. A process which comprises contacting tris 2-(chloromethyl)ethyl phosphite, a compound selected from the group of 1-chloropropan-2-ol, and phosphorus trichloride at a temperature of from about —20° C. to about 50° C. to produce bis 2-(chloromethyl)ethyl phosphite.

References Cited by the Examiner

Kosolapoff: "Organo-Phosphorus Compounds," John Wiley & Sons, New York, N.Y. (1950), p. 182.

Wolf et al.: "Bull. Soc. Chim. France," pp. 124–129 (1960).

References Cited by the Applicant

Van Wazer: Phosphorus and Its Compounds, Interscience Publishers, Inc., New York, 1961, vol. 2, pp. 1266 to 1271.

CHARLES B. PARKER, *Primary Examiner.*

FRANK M. SIKORA, *Assistant Examiner.*